United States Patent [19]

Nakamura

[11] Patent Number: 4,768,261
[45] Date of Patent: * Sep. 6, 1988

[54] SHIRRED CASING DELIVERY APPARATUS FOR MEAT PACKING SYSTEM

[76] Inventor: Minoru Nakamura, 27-6, Seta 1-chome, Setagaya-ku, Tokyo, Japan

[*] Notice: The portion of the term of this patent subsequent to Dec. 12, 2002 has been disclaimed.

[21] Appl. No.: 908,359

[22] Filed: Sep. 17, 1986

Related U.S. Application Data

[63] Continuation of Ser. No. 569,150, Jan. 9, 1984, abandoned.

[30] Foreign Application Priority Data

Jan. 12, 1983 [JP] Japan ................................. 58-2956

[51] Int. Cl.⁴ .............................................. A22C 11/02
[52] U.S. Cl. .................................... 17/41; 17/33; 17/1 R
[58] Field of Search ................. 17/1 R, 33, 35, 41, 17/42, 49; 53/563, 567, 576, 581, 582

[56] References Cited

U.S. PATENT DOCUMENTS

| 3,540,076 | 11/1970 | Urbutis | 17/42 X |
| 3,553,769 | 1/1971 | Myles et al. | 17/41 X |
| 3,919,739 | 11/1975 | Kawai | 17/33 |
| 4,164,057 | 8/1979 | Frey et al. | 17/41 X |
| 4,495,751 | 1/1985 | Galbiati | 53/576 |
| 4,521,938 | 6/1985 | Kupcikevicius | 17/1 R X |
| 4,558,486 | 12/1985 | Nakamura | 17/1 R |
| 4,587,689 | 5/1986 | Nakamura | 17/41 |

FOREIGN PATENT DOCUMENTS 1177029 8/1964 Fed. Rep. of Germany .......... 17/41

Primary Examiner—E. R. Kazenske
Assistant Examiner—Michael D. Folkerts
Attorney, Agent, or Firm—Rosen, Dainow & Jacobs

[57] ABSTRACT

An apparatus for delivering the end of a shirred casing to the nozzle of a meat packing system where the casing is connected to the nozzle to be stuffed with meat extruded from the nozzle includes a support for supporting the shirred casing from the inner side thereof, a clamping unit advanced and retracted together with the support and adapted to hold the end of the shirred casing opposite the nozzle by pressing the casing from within, a drive unit which operates through the support for advancing the clamping unit toward the nozzle and for retracting the clamping unit after the shirred casing is connected to the nozzle, a resisting body advanced and retracted with the support for resisting the folds in the wall of the shirred casing when the support is retracted, thereby to deshirr the shirred casing into a straight, tubular portion as relative movement is established between the casing and the resisting body, and a withdrawal mechanism for pulling the straight, linear portion of the casing backwardly. The meat extruded by the nozzle is stuffed into the tubular portion of the casing, after which the packed meat mass is encased by closing off and fastening the casing at both ends of the encased meat mass.

12 Claims, 6 Drawing Sheets

SHIRRED CASING DELIVERY APPARATUS FOR MEAT PACKING SYSTEM

This is a continuation of application Ser. No. 569,150, filed Jan. 9, 1984, now abandoned.

BACKGROUND OF THE INVENTION

This invention relates to shirred casing delivery apparatus used in a meat packing system of the type in which a shirred casing is connected to a nozzle from which meat is extruded to stuff the casing, wherein the shirred casing is delivered to the nozzle for the connection thereto and formed into a straight, tubular configuration to create a space to be stuffed with the meat. The term "meat" as used herein is taken to mean all varieties of meat such as ham and sausage, as well as mixtures of meat, binder and other additives, which are extruded in the form of a viscous emulsion.

In the prior-art packing apparatus of the foregoing type, the shirred casing is supported while one end thereof is loosely fitted over the outer periphery of a nozzle. Pressure which is developed by stuffing the casing with meat extruded from the nozzle forms the casing into a straight, deshirred tubular configuration which is packed with the meat as the formation process proceeds. However, since a shirred casing is an extremely long casing which is shirred by being folded back on itself longitudinally at a multiplicity of points to effect a reduction in length, the wall thickness of the casing when in this shirred or folded state is large in comparison with the diameter of the casing when fully extended, i.e., deshirred. Since the nozzle is loosely fitted inwardly of the casing wall, a large difference develops between the inner diameter of the nozzle and the diameter of the straight tube into which the shirred casing is formed when the casing is extended by being stuffed with the meat. Owing to this large disparity in diameter, the meat extruded into the casing has a diameter which is much smaller than that of the straight, tubular portion, making it difficult to achieve tight packing of the casing. Proposed solutions to the problem are disclosed in Japanese Patent Application Laid-Open Nos. 50-32315 and 52-27715, which describe systems for stuffing a casing with meat by disposing a casing at a position forwardly of the direction in which meat is extruded from the nozzle and connecting the casing to the nozzle to effect the stuffing operation. In the disclosed arrangements, the casing is held sandwiched between an inner cylinder and an outer cylinder fitted over the inner cylinder. The casing is paid out toward the nozzle by driving the outer cylinder, with an assist from the action of an engaging member that engages the inner cylinder. Accordingly, the proposed arrangements have an extremely complicated operating mechanism and, being applicable solely to casings of a straight, tubular configuration, are not suitable for application to shirred casings.

SUMMARY OF THE INVENTION

An object of the present invention is to provide a shirred casing delivery apparatus for a meat packing system which is simple in construction and easy to operate.

Another object of the present invention is to provide a shirred casing delivery apparatus for a meat packing system wherein a shirred casing can be continuously and automatically stuffed with a mass of meat having a diameter close to that of the casing diameter.

A further object of the present invention is to provide a shirred casing delivery apparatus for a meat packing system wherein economical use is made of the casing by eliminating excess casing length when the casing is severed.

According to the present invention, the foregoing objects are attained by providing a shirred casing delivery apparatus for a meat packing system of the type in which a shirred casing is connected to a nozzle from which meat is extruded to stuff the casing, the delivery apparatus comprising a support, a clamping unit, a drive unit, a resisting body and a withdrawal mechanism.

The support is adapted to support the shirred casing, from the inner side thereof, at a position toward which meat is extruded from the nozzle. No limitation is placed upon the shape of the support, which may for example be a cylindrical or frame-like body. The outer dimensions of the supporting surface, such as the outer diameter of a cylinder if this is the configuration adopted for the support, need not be highly precise. What is required is that the support be capable of supporting the shirred casing from its inner side. Accordingly, the support is such as is capable of supporting any shirred casing irrespective of the inner diameter of the casing.

The clamping unit applies pressure to the inner side of the shirred casing, which is supported on the support, to hold the leading end of the casing opposite the end of the nozzle, and is so disposed as to be advanced and retracted together with the support. Means for producing the holding force by applying pressure to the inner side of the casing are provided. Examples are means using a resilient force applied by springs or the like, means having a mechanism capable of expanding in the diammetric direction, or means for pressing the inner wall of the casing by expanding diammetrically within the casing in response to fluid pressure. Since the leading end of the shirred casing is retained so that the drive unit may deliver this end of the casing to the nozzle for the connection thereto, it goes without saying that the holding force applied to the inner side of the casing by the clamping unit must be large enough to achieve the stated purpose. However, the holding force need only be applied when the clamping unit advances the casing forwardly, that is, toward the nozzle. During retraction, the holding force is removed or, if desired, applied only lightly.

The drive unit is connected to the support to advance the clamping unit toward the nozzle via the support and then retract the clamping unit after the shirred casing is connected to the nozzle.

The resisting body is advanced and retracted together with the support and resistively engages the folds in the wall of the shirred casing during the retraction of the support so that, owing to the relative movement between the shirred casing and the resisting body engaging the folded wall, the shirred casing is deshirred and formed formed into a straight, tubular portion defining a space into which meat is extruded for packing.

The withdrawal mechanism is for the purpose of tensioning the casing by means of the internal pressure of the meat mass, which has been stuffed into the straight, tubular portion of the casing, thereby to pack the meat into this portion of the casing as firmly as possible, and is operable to pull the straight, tubular portion of the casing rearwardly, namely in the direction away from the nozzle, when the tubular portion is constricted for closing and fastening the same. The withdrawal mechanism may be of any construction that holds and retracts the aftmost portion of the straight, tubular portion of the casing. For example, the withdrawal mechanism may have a configuration that allows the clamping unit to hold and retract the casing, or may comprise a separately provided mechanism for grasping the casing from the inner and outer sides thereof and for subsequently retracting the casing.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Reference will now be had to the accompanying drawing to described a preferred embodiment of a shirred casing delivery apparatus according to the present invention.

Figure 1:
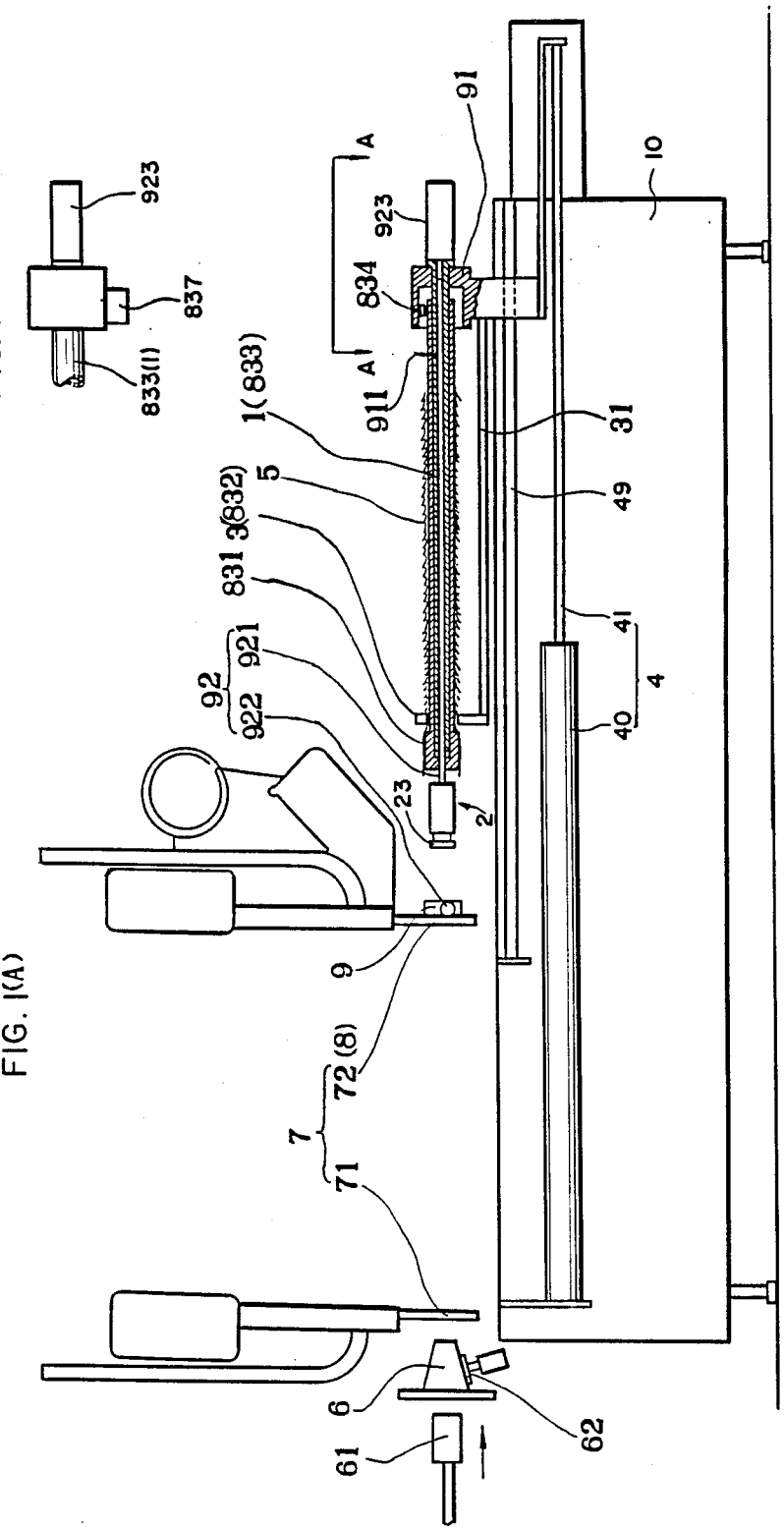
FIG. 1(A) is a front view illustrating the overall appearance of a meat packing system which employs the shirred casing delivery apparatus embodying the present invention.
FIG. 1(B) is a view seen along line A—A of FIG. 1(A)

With reference first to FIG. 1, a support 1 has a cylindrical configuration and supports a shirred casing 5 from the inner side thereof. A piston 61 operatively associated with a nozzle 6 is adapted to extrude meat from the nozzle 6 in the direction of the arrow. The support 1 is disposed at a position forwardly of the direction in which the meat is extruded from the nozzle 6, namely to the right of the nozzle, and is fitted on a guide pipe 911 so as to be slidable along substantially the entire length of the guide pipe, the latter extending forwardly from a holder 91 advanced and retracted by a drive unit 4, described below. The support 1 functions also as a withdrawing member 833, described below, and is positioned on the guide pipe 911 by means of a withdrawal cam mechanism which acts upon the aft end portion of the support. The arrangement is such that, when the cam mechanism is inoperative, the support 1 and guide pipe 911 are advanced and retracted together with the holder 91 by the action of the drive unit 4.

The drive unit 4 comprises an air cylinder 40 secured to the frame 10 of the apparatus, and a rod 41 operated by the air cylinder 40 and connected to the holder 91. More specifically, the rod 41 is connected at its distal end to the lower end of the holder 91, and the lower portion of the holder 91 is slidably guided by a guide bar 49.

Figure 2:
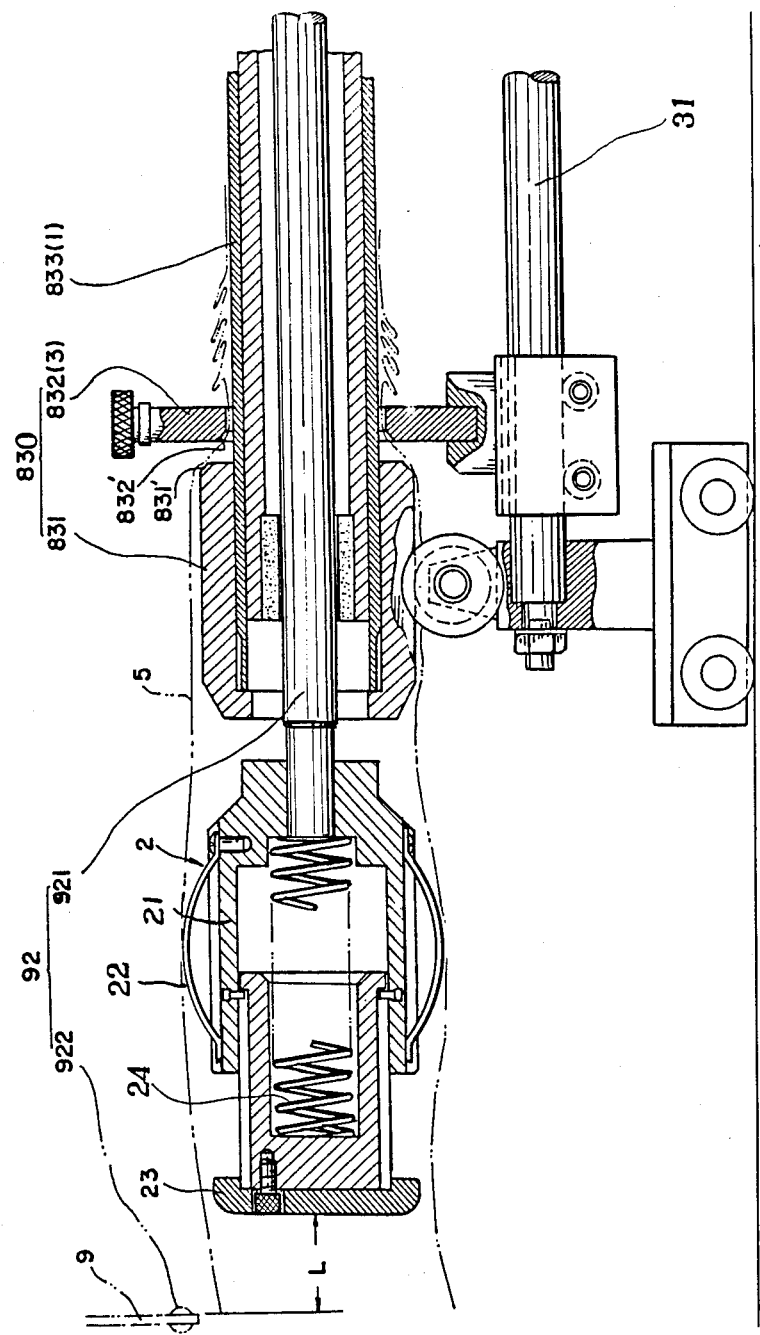
FIG. 2 is a sectional view of a support, a clamping unit a portion of a chuck of a withdrawal mechanism in in the apparatus of FIG. 1.

A clamping unit 2 is disposed at a position immediately ahead of the support 1 and, as shown in greater detail in FIG. 2, includes a cylindrical body 21 and a plurality of leaf springs 22 secured to the outer periphery of the cylindrical body 21. The leaf springs 22, which extend axially of the cylindrical body and are suitably spaced apart circumferentially of the same, are adapted to apply a resilient force directly radially outwardly of the cylindrical body to hold a shirred casing 5 from the inner side thereof. The clamping unit 2 is attached to the leading end of a rod 921 that passes through the hollow interior of the support 1, the aft end of the rod 921 being connected to the rod of an aligning cylinder 923 attached to the aft end face of the holder 91. The aligning cylinder 923 is for the purpose of actuating aligning means, described below. When the casing 5 is deshirred into the form of a straight, tubular portion, a resisting body 3, described below, moves together with the holder 91, the aligning cylinder 923 being inoperative at such time.

Disposed slidably at the leading end of the clamping body 2 is a head 23 urged forwardly by a compression spring 24 housed within the cylindrical body 21. When the clamping unit 2 is advanced to cause the head 23 to abut against the nozzle 6, the head 23 recedes backwardly within the casing 5 so that the leading end of the casing protrudes from the head. This facilitates the operation of fitting the end of the casing over the nozzle 6. The force applied by the compression spring 24 keeps the head 23 at the leftmost position when the head is not in abutting contact with the nozzle 6.

The resisting body 3 mentioned above is attached to a support rod 31 extending forwardly from the holder 91, and is set at a position adjacent the leading end portion of the support 1. The resisting body 3 comprises a disk- or plate-shaped member having an aperture which is opened and closed in order that the shirred casing may be stuffed with meat. When closed, the resisting body resistively engages the folded wall of the shirred casing 5 to aid in deshirring the casing, as will be described in detail hereinbelow.

A withdrawal mechanism has a chuck 830 comprising inner and outer grips 831, 832. As shown in FIG. 2, the inner grip 831 is connected to a withdrawing member 833, which serves also as the support 1, and is withdrawn by a cam mechanism illustrated in FIGS. 3 and 4. More specifically, a cam roller 834 is attached to the aft end of the withdrawing member 833. A cam 836, which cooperates with the cam roller 834, has an inclined cam face 836', and is slid along a shaft 838 by a cylinder 837. The inner grip 831 has an oblique surface 831' on the edge of its aft end for coming into surface contact with an oblique surface 832' of the outer grip 832. The latter serves also as the resisting body 3. More specifically, the outer grip 832 is formed of a disk- or plate-shaped member having an openable and closable aperture, as described above. The rear face of the outer grip 832 comes into abutting contact with the folds in the wall of the shirred casing when the grip 832 is retracted following connection of the casing to the nozzle. The oblique surface 832', formed on the rim of the aperture on the forward side of the outer grip 832, cooperates with the oblique surface 831' of the inner grip 831 to grasp the casing 5 during withdrawal.

Figure 4:
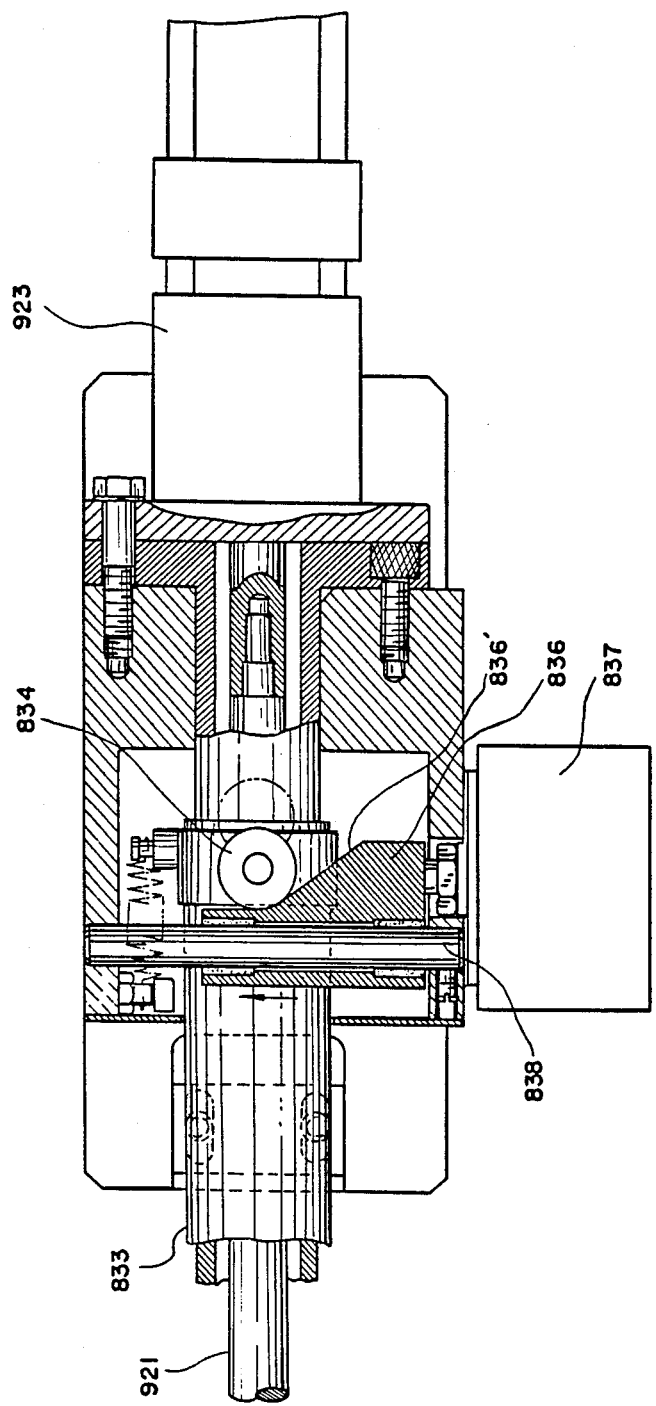
FIG. 4 is a transverse sectional view of the cam mechanism shown in FIG. 3.

The withdrawal operation for tensioning the casing 5 is performed in the following manner. First, the cylinder 837 is actuated to move the cam 836 upwardly, i.e., in the direction of the arrow, as shown in FIG. 4. This causes the cam surface 836' to push the cam roller 834 to the right, or retracting direction, thereby retracting the withdrawing member 833 so that the casing 5 is grasped by the oblique surfaces 831', 832' of the inner and outer grips 831, 832 shown in FIG. 2. This completes the preparations for withdrawal of the casing. Next, by retracting the rod 41, the support 1 and clamping unit 2 are retracted together to actually withdraw the casing.

The clamping unit 2 in the illustrated preferred embodiment further includes aligning means 92 which, as the clamping unit 2 is advanced, brings the leading end of the clamping unit 2 into a prescribed positional relationship, such as perfect coincidence, with the position at which the shirred casing is cut, i.e., the position corresponding to the leading end of the casing. The aligning means 92 allows the casing to be used economically while the casing length to be fit on the nozzle is maintained at an optimum, constant value. It also allows the leading end of the casing, which is constricted and tends to droop at cutting, to be opened so that the leading end can be connected to the nozzle in reliable fashion.

The aligning means 92 comprises a sensor 922 disposed at the position at which the casing is cut, and a rod 921 connected to the aft portion of the clamping unit 2 for moving the leading end (the head 23 in FIG. 2) of the clamping unit 2 up to the position of the sensor 922. The rod 921 has its aft end coupled to an aligning cylinder 923 and is so adapted as to be movable forwardly, independently of the support 1, by the cylinder 923 during the aligning operation. Before the clamping unit 2 is advanced for the purpose of connecting the shirred casing to the nozzle, a distance L, which is measured between the position of the leading end of the clamping unit and the position at which the casing is cut, is inconstant because the distance over which the clamping unit 2 is withdrawn to tension the casing differs from product to product, i.e., depending upon the size of the meat mass extruded with each stuffing operation. Accordingly, the rod 921 is advanced by the aligning cylinder 923 until a signal is produced by the sensor 922, this occurring at the instant the leading end (head 23) of the clamping unit 2 reaches the position of the sensor. The aligning cylinder 923 is deactivated in response to the signal and, hences, halts the clamping unit at the abovementioned position. Next, the clamping unit 2 is advanced together with the support 1 by actuating the cylinder 40 to connect the casing to the nozzle. However, since the position of the clamping unit 2 relative to the rod 41 will differ at the time of the alignment with each stuffing operation, as described above, the clamping unit must be restored to the prescribed, original positional relationship.

Accordingly, the clamping unit 2, which is now at the aligned position, is returned to the original position by actuating the cylinder 923 before or during the advance of the rod 41 for the purpose of connecting the casing to the nozzle. If the apparatus is provided with a function for advancing the clamping unit 2 by, e.g., a motor-driven ball screw mechanism instead of the cylinder 40 while distance is computed, the clamping unit 2 can be advanced in the direction for connecting the casing upon effecting an offset equivalent to the amount of retraction to the original position. It should be noted that the means such as a proximity switch or photoelectric switch can be used as the sensor 922.

Returning to FIG. 1, a chuck 62 is operable to clamp the end of the shirred casing 5 against the outer side of the nozzle 6 over which the casing is to be fitted. Reference numeral 7 designates fastening means comprising first and second fastening units 71, 72 for successively closing and fastening the casing at both ends of a meat mass after the meat has been stuffed into a straight, tubular portion of the casing from the nozzle 6. The second fastening unit 72 houses constricting means 8 for squeezing or constricting the casing 5, and is further provided with cutting means 9 closely adjacent to the back side of the constricting means 8 for cutting off a segment of the casing.

Where a meat mass has an extremely irregular shape, air may remain entrapped within the casing if use is made solely of the above-described withdrawal mechanism for tensioning the casing. Therefore, if a vacuum deaerator for extracting air from the casing is connected to the apparatus and used conjointly with the withdrawal mechanism for tensioning the casing, perfect deaeration can be achieved in all cases to prevent any deterioration in the quality of the encased meat mass.

The operating sequence of the apparatus embodying the present invention will be described with reference to FIG. 5.

(1) First, the shirred casing 5 is supported by being fitted over the support 1. At this time the support 1 is in the fully retracted or "home" position, and the chuck 830 is open. The leading end of the shirred casing 5 is then pulled from the support 1 by hand and brought to the position of the sensor 922 through the clearance between the inner grip 831 and outer grip 832 of the chuck 830. This causes the portion of the casing 5 forwardly of the resisting body 3 to be deshirred into a smooth or wrinkle-free configuration owing to the action of the resisting body, with the deshirred portion being supported from the inner side thereof by the leaf springs 22 of the clamp unit 2. Note also that the leading end of the casing 5 projects beyond the head 23. This completes the procedure for setting the shirred casing 5, after which the apparatus is set into operation [FIG. 5(A)].

(2) Next, the chuck 830 is closed to grasp the shirred casing 5 between the inner and outer grips 831, 832 of the chuck. This is following by actuating the cylinder 923 of the aligning means 92, whereby the clamping unit 2 is advanced until the sensor 922 senses the leading end face of the head 23, in response to which operation of the clamping unit 2 is stopped. This brings the leading end of the shirred casing 5 into coincidence with the leading end of the head 23 [FIG. 5(B)].

Figure 5A:
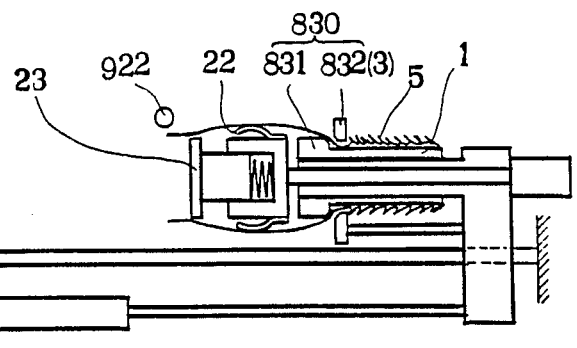
FIGS. 5(A)-5(G) are schematic views illustrating the construction and principle of operation of the shirred casing delivery apparatus embodiment the present invention.
Figure 5B:
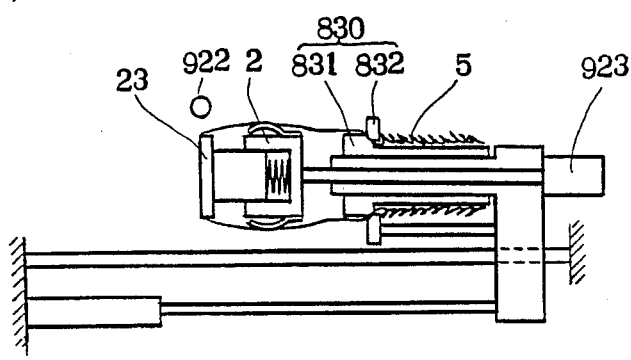
Figure 5C:
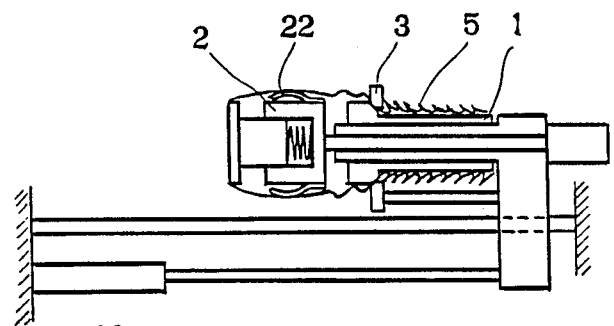
Figure 5D:
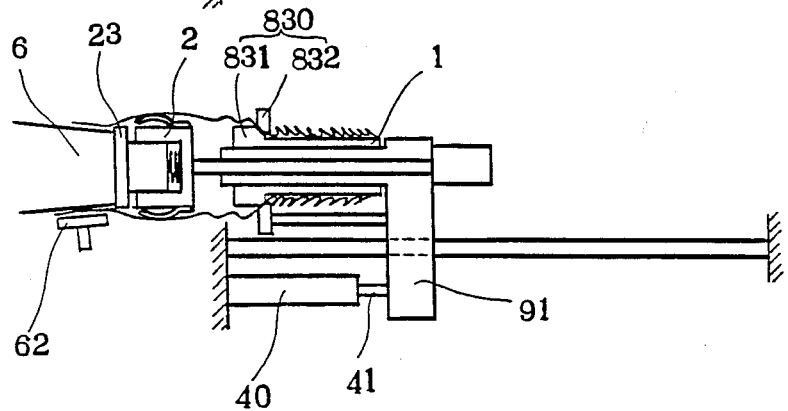
Figure 5E:
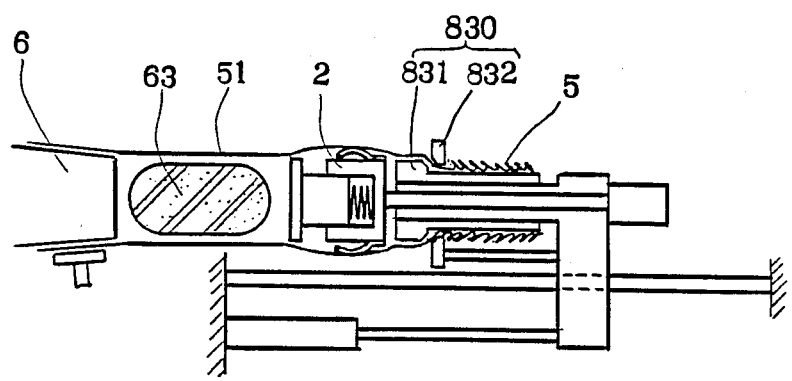
Figure 5F:
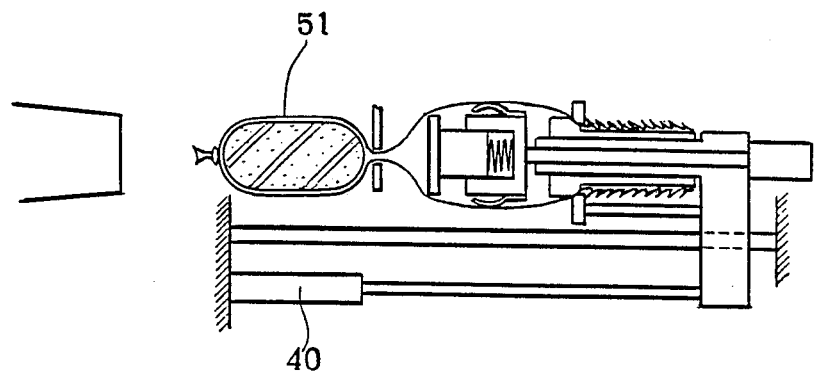
Figure 5G:
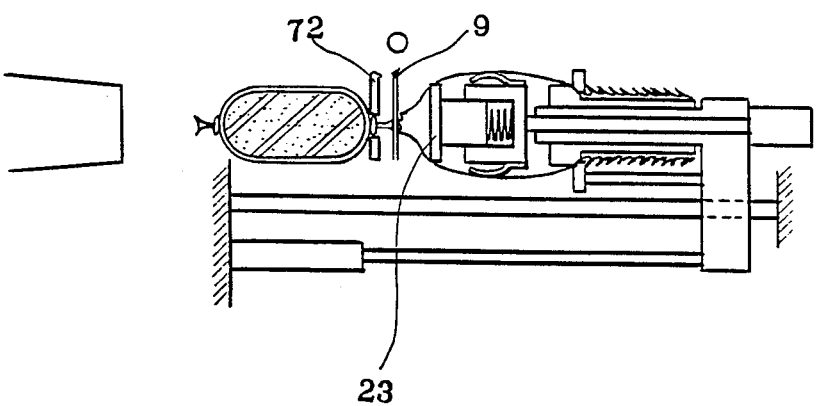

(3) Thereafter, the clamping unit 2 is restored to the home position, namely to a position identical with that shown in FIG. 5(A). However, now the leading end of the casing 5 is in agreement with the leading end face of the head 23, and the portion of the casing between the resisting body 3 and springs 22 is somewhat wrinkled [FIG. 5(C)].

(4) Next, the air cylinder 40 of the drive unit 4 is actuated, whereby the rod 41 of the drive unit advances the holder 91, together with the support 1 and clamping unit 2 which are held by the holder 91. When the head 23 of the clamping unit 2 comes into abutting contact with the nozzle 6, the head 23 recedes within the leading end of the casing, with the latter being fitted over the tip of the nozzle 6. The chuck 62 is then actuated to clamp the shirred casing 5 against the side wall of the nozzle 6 over which the leading end of the casing has been fitted. The air cylinder 40 is in the inoperative state from the moment the head 23 contacts the nozzle 6 until the shirred casing is clamped in place by the chuck 62. It should be noted that the inner and outer grips 831, 832 may be in either the open or closed state from the moment the support 1 starts to be advanced until the moment the chuck 62 is actuated. The grips 831, 832 are shown to be in the closed state in order to simplify operation [FIG. 5(D)].

(5) At the instant the chuck 62 is actuated to clamp the shirred casing in place, or subsequently thereto, the inner and outer grips 831, 832 are opened and the clamping unit 2 is retracted. This causes the shirred casing 5 to be deshirred into a straight, tubular portion 51 by the action of the resisting body 3. Meat is then extruded from the nozzle 6 to stuff the portion 51 of the casing with a meat mass 63. It should be noted that the meat stuffing operation can be carried out while the straight, tubular portion is being formed, in which case the time required for packing will be reduced [FIG. 5(E)].

Figure 3:
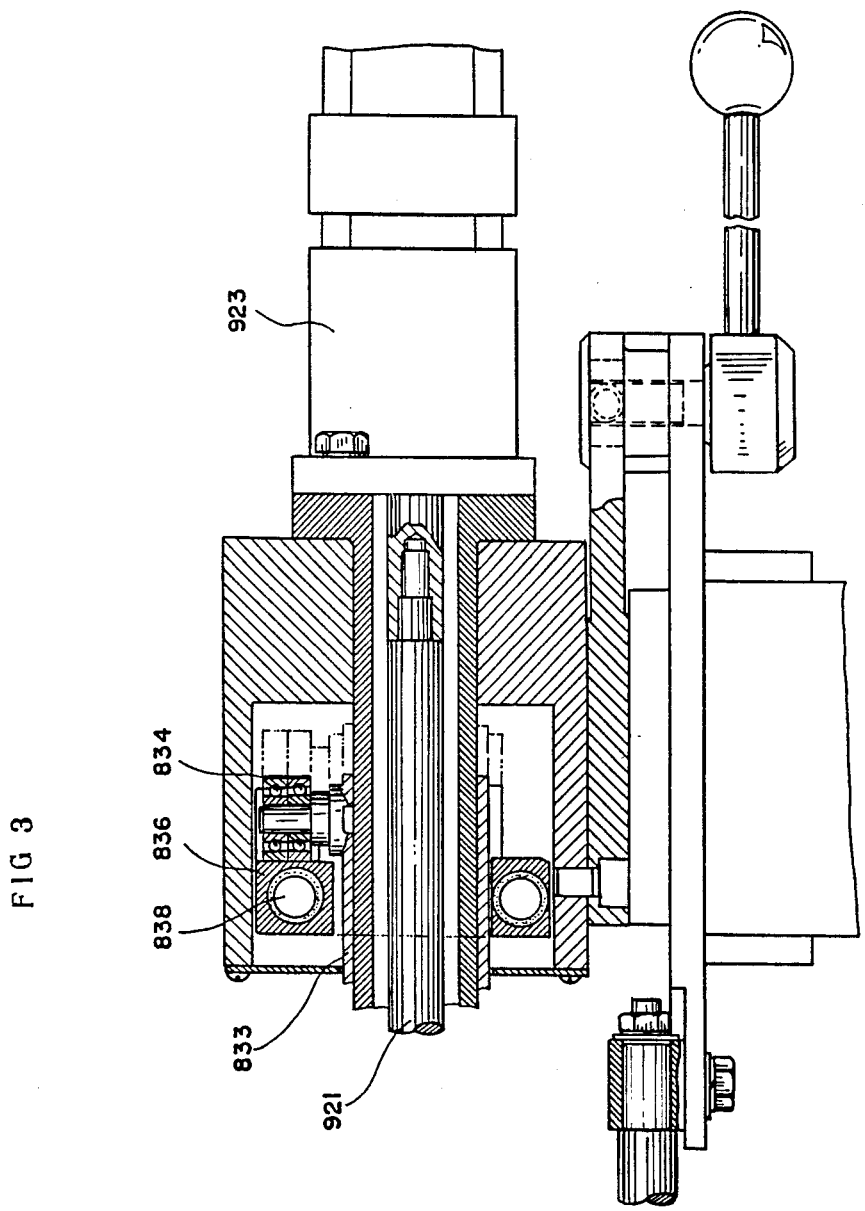
FIG. 3 is a longitudinal sectional view illustrating a cam mechanism for the chuck shown in FIG. 2.

(6) The next step is to close off and fasten the straight, tubular portion 51 of the casing on the left side of the meat mass by the first fastening unit 71. This is followed by retracting the chuck 62 from the nozzle to release the casing. The straight, tubular portion 51 of the casing on the right side of the meat mass is constricted in diameter by a constricting mechanism housed within the second fastening unit 72. This constricting operation may be performed at any time provided it follows the stuffing of the tubular portion with meat. Next, the withdrawal mechanism illustrated in detail in FIGS. 3 and 4 is set into operation. More specifically, the cam 836 is driven by the cylinder 837 to close off the aft end portion of the straight, tubular portion by the action of the inner and outer grips 831, 832, after which the support 1 is retracted by actuating the cylinder 40. As a result, the straight, tubular portion 51 is pulled backwardly while the portion thereof on the right side of the meat mass remains constricted. This aids in expelling air from the interior of the tubular portion and causes the meat mass take on a circular cross section owing to the applied pressure, while both ends of the encased meat mass are shaped into a rounded configuration [FIG. 5(F)].

(7) Finally, after the encased meat mass has been closed and fastened on the right side thereof by the second fastening unit 72, the casing is cut off at a position just to the right of the fastening by the cutting means 9. This provides one link of the encased meat product [FIG. 5(G)]. Thereafter, the head 23 is advanced up to the cutting position of the shirred casing 5 and the apparatus is returned to the state shown in FIG. 5(B) to prepare for the next packing operation. This is followed by repeating the steps from (B) onward.

Thus, the shirred casing delivery apparatus of present invention as described and illustrated hereinabove operates by disposing the shirred casing 5 at a position forwardly of the direction in which the meat is extruded from the nozzle 6, holding the casing from the inner side thereof by the clamping unit 2 on the side facing the nozzle, advancing the clamping unit 2 to connect the casing 5 to the nozzle 6, and forming the casing into the straight tubular portion 51. This allows the casing to be packed with meat extruded from the nozzle the inner diameter whereof approximates that of the straight tubular portion 51, thereby improving packing efficiency to a great degree. In addition, the effectiveness of the overall operation is enhanced because packing is performed continuously in automatic fashion. Further, since the apparatus enables shirred casings of different inner diameters to be packed with meat without requiring any changing of parts, the apparatus is simplified in construction and made easier to use. In addition to making continuous stuffing possible, the invention makes it possible to align the leading end of the clamping unit with the position at which the casing is cut. This eliminates casing loss so that the shirred casing can be used with greater economy.

As many apparently widely different embodiments of the present invention can be made without departing from the spirit and scope thereof, it is to be understood that the invention is not limited to the specific embodiments thereof except as defined in the appended claims.

What we claim is:

1. A shirred casing delivery apparatus for a meat packing system in which a shirred casing is connected to a nozzle and packed with meat extruded from the nozzle, comprising;

movable supporting means for supporting the entire length of the shirred casing from the inner side thereof at a position forwardly of the direction in which the meat is extruded from the nozzle;

clamping means having radially extending elements for holding the shirred casing, which is supported by said supporting means, at an end of the casing facing said nozzle, by applying force for pressing the shirred casing outwardly from the inner side thereof, said clamping means being advanced and retracted together with said supporting means;

first drive means which reciprocates said supporting means for advancing said clamping means toward the nozzle to connect the shirred casing to the nozzle and for subsequently retracting said supporting means and clamping means;

resisting means advanced and retracted together with said supporting means for resistively engaging the outer wall surface of the shirred casing when said clamping means is retracted after said connection between casing and nozzle, said resisting means forming the shirred casing into a straight, tubular portion because of relative movement between the casing wall and the resisting means resistively engaged therewith; and withdrawal means for first moving relative to said resisting means for grasping the casing and second, after said grasping, moving together with said resisting means away from said nozzle for tensioning the casing.

2. A shirred casing delivery apparatus according to claim 1 and further comprising second drive means, and wherein said first movement of said withdrawal means is done by said second drive means and said second movement of said withdrawal means is done by said first drive means.

3. A shirred casing delivery apparatus according to claim 2, wherein said withdrawal means comprises inner and outer grips disposed on inner and outer sides of the shirred casing and moved relative to each other by said second drive means for grasping the casing.

4. A shirred casing delivery apparatus according to claim 1, wherein said clamping means includes a head portion brought into abutting contact with the nozzle when said clamping means is advanced, at which time said head portion recedes within the shirred casing to project the leading end of the shirred casing beyond said head portion in order to be fitted over the nozzle.

5. A shirred casing delivery apparatus according to claim 1, wherein said clamping means includes aligning means for establishing a prescribed postional relationship between a leading end of said clamping means and a position at which the shirred casing is cut.

6. A shirred casing delivery apparatus for a meat packing system in which a shirred casing is connected to a nozzle and packed with meat extruded from the nozzle, comprising:

movable supporting means for supporting the entire length of the shirred casing from the inner side thereof at a position forwardly of the direction in which the meat is extruded from the nozzle;

clamping and tensioning means having radially extending elements for holding the shirred casing, which is supported by said supporting means, at an end of the casing facing said nozzle by applying force for pressing the shirred casing outwardly from the inner side thereof, said clamping and tensioning means being advanced and retracted together with said supporting means;

drive means which reciprocates said supporting means for advancing said clamping and tensioning means toward the nozzle to connect the shirred casing to the nozzle and for subsequently retracting said support means and clamping and tensioning means;

resisting means advanced and retracted together with said supporting means for resistively engaging the outer wall surface of the shirred casing when said clamping means is retracted after said connection between casing and nozzle, said resistance means forming the shirred casing into a straight, tubular portion because of relative movement between the casing wall and the resisting means resistively engaged therewith.

7. The shirred casing delivery apparatus according to claim 1, wherein said clamping and tensioning means includes a head portion brought into abutting contact with the nozzle when said clamping and tensioning means is advanced, at which time said head portion recedes within the sirred casing to project the leading end of the shirred casing beyond said head portion in order to be fitted over the nozzle.

8. The shirred casing delivery apparatus according to claim 6, wherein said clamping and tensioning means includes aligning means for establishing a prescribed positional relationship between a leading end of said clamping and tensioning means and a position at which the sirred casing is cut.

9. A shirred casing dleivery apparatus for a meat packing system in which a shirred casing is connected to a nozzle and packed with meat extruded from the nozzle, comprising;

movable supporting means for supporting the entire length of the shirred casing form the inner side thereof at a position forwardly of the direction in which the meat is extruded from the nozzle;

clamping means having radially extended leaf springs for holding the shirred casing, which is supported by said supporting means, at an end of the casing facing said nozzle by applying force for pressing the shirred casing outwardly from the inner side thereof, said clamping means being advanced and retracted together with said supporting means;

drive means which reciprocates said suppporting means for advancing said clamping means toward the nozzle to connect the shirred casing to the nozzle and for subsequently retracting said supporting means and clamping means;

resisting means advanced and retracted together with said supporting means for resistively engaging the outer wall surface of the shirred casing when said clamping means is retracted after said connection between casing and nozzle, said resisting means forming the shirred casing into a straight, tubular portion because of relative movement between the casing wall and the resisting means rsistively engaged therewith.

10. A shirred casing dleivery apparatus according to claim 9, wherien said clamping means includes a head portion brought into abutting contact with the nozzle when said clamping means is advanced, at which time said head portion recedes within the shirred casing to project the leading end of the shirred casing beyond said head portion in order to be fitted over the nozzle.

11. The shirred casing delivery apparatus according to claim 10, wherein said clamping means includes aligning means for establishing a prescribed positional relationship between a heading end of said clamping means and a position at which the shirred casing is cut.

12. A shirred casing delivery apparatus for a meat packing system in which a shirred casing is connected to a nozzle and packed with meat extruded from the nozzle, comprising;

movable supporting means for supporting the entire length of the shirred casing from the inner side thereof at a position forwardly of the direction in which the meat is extruded from the nozzle;

clamping means having radially extending elements for holding the shirred casing, which is supported by said supporting means, at an end of the casing facing said nozzle, by applying force for pressing the shirred casing outwardly from the inner side thereof, said clamping means being advanced and retracted together with said supporting means;

first drive means which reciprocates said supporting means for advancing said clamping means toward the nozzle to connect the shirred casing to the nozzle and for subsequently retracting said supporting means and clamping means;

resisting means advanced and retracted together with said supporting means for resistively engaging the outer wall surface of the shirred casing when said clamping means is retracted after said connection between casing and nozzle, said resisting means forming the shirred casing into a straight, tubular portion because of relative movement between the casing wall and the resisting means resistively engaged therewith; and tensioning means for engaging said casing filled with meat extruded from said nozzle while said casing is still attached to said nozzle, and for pulling said casing in a direction away from said nozzle, said casing being tensioned over said meat.

* * * * *

UNITED STATES PATENT AND TRADEMARK OFFICE
CERTIFICATE OF CORRECTION

PATENT NO. : 4,768,261

DATED : September 6, 1988

INVENTOR(S) : Minoru Nakamura

It is certified that error appears in the above-identified patent and that said Letters Patent is hereby corrected as shown below:

Column 1, lines 44 and 45, change "Laid-Open" to --Publication--.

Column 2, line 60, omit "formed" first occurrence.

Column 3, line 38, change "described" to --describe--.

Column 5, line 42, change "hences" to --hence--.

Column 6, line 40, change "following" to --followed--.

Column 7, line 36, after "mass" insert --to--.

Column 9, line 34, change "claim 1" to --claim 6--;

line 47, change "dleivery" to --delivery--.

Column 10, line 13, change "rsistively" to --resistively--.

Signed and Sealed this

Thirtieth Day of October, 1990

Attest:

HARRY F. MANBECK, JR.

*Attesting Officer*   *Commissioner of Patents and Trademarks*